United States Patent
Kawasato et al.

(10) Patent No.: US 7,842,268 B2
(45) Date of Patent: Nov. 30, 2010

(54) PROCESS FOR PRODUCING LITHIUM-CONTAINING COMPOSITE OXIDE FOR POSITIVE ELECTRODE FOR LITHIUM SECONDARY BATTERY

(75) Inventors: Takeshi Kawasato, Chigasaki (JP); Tokumitsu Kato, Chigasaki (JP); Megumi Uchida, Chigasaki (JP); Naoshi Saito, Chigasaki (JP); Manabu Suhara, Chigasaki (JP)

(73) Assignee: AGC Seimi Chemical Co., Ltd., Chigasaki (JP)

( * ) Notice: Subject to any disclaimer, the term of this patent is extended or adjusted under 35 U.S.C. 154(b) by 626 days.

(21) Appl. No.: 11/838,283

(22) Filed: Aug. 14, 2007

(65) Prior Publication Data

US 2007/0298324 A1 Dec. 27, 2007

Related U.S. Application Data

(63) Continuation of application No. PCT/JP2006/302261, filed on Feb. 9, 2006.

(30) Foreign Application Priority Data

Feb. 14, 2005 (JP) ............................ 2005-036102

(51) Int. Cl.
 *H01M 4/00* (2006.01)
(52) U.S. Cl. ................. 423/277; 423/301; 423/306; 252/519.1; 252/519.12; 252/519.13; 252/519.14; 252/519.15; 252/182.1; 429/219; 429/220; 429/221; 429/222; 429/223; 429/224; 429/229; 429/231.1; 429/231.2; 429/231.3
(58) Field of Classification Search ............. 252/182.1, 252/519.1, 519.12–519.15; 423/277, 301, 423/306; 429/219–224, 229, 231.1, 231.2, 429/231.3
See application file for complete search history.

(56) References Cited

U.S. PATENT DOCUMENTS

| | | | |
|---|---|---|---|
| 5,742,070 | A | 4/1998 | Hayashi et al. |
| 7,135,251 | B2 | 11/2006 | Cho et al. |
| 2002/0009644 | A1 | 1/2002 | Yoshimura et al. |
| 2002/0037456 | A1 | 3/2002 | Hosoya |
| 2003/0073004 | A1 | 4/2003 | Kweon et al. |
| 2004/0201948 | A1 | 10/2004 | Hosoya et al. |
| 2004/0229124 | A1 | 11/2004 | Miyamoto et al. |
| 2006/0154146 | A1 | 7/2006 | Kawasato et al. |
| 2006/0210879 | A1 | 9/2006 | Kawasato et al. |
| 2007/0026314 | A1 | 2/2007 | Kawasato et al. |

FOREIGN PATENT DOCUMENTS

| | | |
|---|---|---|
| JP | 5-325971 | 12/1993 |
| JP | 10-144315 * | 5/1998 |
| JP | 2000-149923 | 5/2000 |
| JP | 2000-260432 | 9/2000 |
| JP | 2001-243981 | 9/2001 |
| JP | 2003-7299 | 1/2003 |
| JP | 2003-221234 | 8/2003 |
| JP | 2003-234102 | 8/2003 |
| JP | 2004-103566 | 4/2004 |
| JP | 2004-119221 | 4/2004 |
| JP | 2004-319105 | 11/2004 |
| JP | 2004-335278 | 11/2004 |
| JP | 2004-363097 | 12/2004 |

OTHER PUBLICATIONS

Translation of Japan 10-144315, May 29, 1998.*
Translation of Japan 2000-149923, May 30, 2000.*
U.S. Appl. No. 11/942,208, filed Nov. 19, 2007, Saito, et al.
U.S. Appl. No. 11/940,689, filed Nov. 15, 2007, Saito, et al.
U.S. Appl. No. 12/175,652, filed Jul. 18, 2008, Suhara, et al.

* cited by examiner

*Primary Examiner*—Steven Bos
(74) *Attorney, Agent, or Firm*—Oblon, Spivak, McClelland, Maier & Neustadt, L.L.P.

(57) ABSTRACT

To provide a cathode active material for a lithium secondary battery, which is low in gas generation and has high safety and excellent durability for charge and discharge cycles even at a high charge voltage.

A process for producing a lithium-containing composite oxide represented by the formula $Li_pL_qN_xM_yO_zF_a$ (wherein L is at least one element selected from the group of B and P, N is at least one element selected from the group consisting of Co, Mn and Ni, M is at least one element selected from the group consisting of Al, alkaline earth metal elements and transition metal elements other than N, $0.9 \leq p \leq 1.1$, $1.0 \leq q < 0.03$, $0.97 \leq x < 1.00$, $0 \leq y \leq 0.03$, $1.9 \leq z \leq 2.1$, $q+x+y=1$ and $0 \leq a \leq 0.02$), wherein a lithium-containing composite oxide powder containing an N element and, if necessary, an M element and fluorine, is preliminarily prepared; the lithium-containing composite oxide powder is mixed with an aqueous solution containing the L element source; from the obtained mixture, an aqueous medium is removed, followed by the firing in an oxygen-containing atmosphere at from 300 to 1,050° C.

17 Claims, 1 Drawing Sheet

PROCESS FOR PRODUCING LITHIUM-CONTAINING COMPOSITE OXIDE FOR POSITIVE ELECTRODE FOR LITHIUM SECONDARY BATTERY

BACKGROUND OF THE INVENTION

1. Field of the Invention

The present invention relates to a process for producing a lithium-containing composite oxide for a positive electrode for a lithium secondary battery, which is low in gas generation and has a large volume capacity density, high safety, a high average operating voltage, excellent durability for charge and discharge cycles and excellent low temperature characteristics; a positive electrode for a lithium secondary battery containing the lithium-containing composite oxide produced; and a lithium secondary battery.

2. Discussion of Background

Recently, as the portability and cordless tendency of instruments have progressed, a demand for a non-aqueous electrolyte secondary battery such as a lithium secondary battery which is small in size and light in weight and has a high energy density, has been increasingly high. As a cathode active material for the non-aqueous electrolyte secondary battery, a composite oxide of lithium and a transition metal such as $LiCoO_2$, $LiNiO_2$, $LiNi_{0.8}Co_{0.2}O_2$, $LiMn_2O_4$ or $LiMnO_2$, has been known.

Among them, a lithium secondary battery using a lithium-containing composite oxide ($LiCoO_2$) as a cathode active material and using a lithium alloy or carbon such as graphite or carbon fiber as a negative electrode, can produce a high voltage at a level of 4V, whereby it has been widely used as a battery having a high energy density.

However, in the case of the non-aqueous type secondary battery using $LiCoO_2$ as a cathode active material, further improvement of the capacity density per unit volume of a positive electrode layer and the safety, has been desired. On the other hand, there has been a problem of deterioration of the cyclic properties such as gradual reduction of the battery discharge capacity due to repetitive charge and discharge cycles, a problem of the weight capacity density or substantial reduction of the discharge capacity at a low temperature.

Further, recently, in addition to a cylindrical cell used for e.g. a laptop computer, a prismatic cell or an aluminum laminate prismatic cell has been widely used for e.g. a mobile phone which has been required to be thin. However, there is a serious problem that a prismatic cell is swelled by the increase of the internal pressure due to the gas generation, which has not been problematic in the case of the conventional cylindrical cell having a strong cell structure. The gas generation in the secondary battery is caused by thermal decomposition of a cathode active material itself or the decomposition of an electrolyte by its contact with a cathode active material. Therefore, it is desired to have a positive electrode material which can suppress gas generation more than ever.

In order to solve these problems, Patent Documents 1 to 3 have proposed to coat the surface of a cathode active material with e.g. $Al_2O_3$, $AlPO_4$, $TiO_2$ or $ZrO_2$ which can inactivate the reaction with an electrolyte, but there has been a problem such that conductivity of cathode active material particles is lowered. Further, Patent Documents 4 and 5 have proposed to apply a lithium-titanium composite oxide as a coating material having conductivity imparted. However, in such a case, though the discharge capacity is improved at the time of high-current discharge, the effect of suppressing gas generation has not sufficiently been improved.

On the other hand, in order to prevent deterioration of cyclic properties and suppress gas generation, Patent Document 6 discloses a lithium composite oxide having a composition of $LiB_xCo_{(1-x)}O_2$ (wherein $0.001 \leq x \leq 0.25$) which is obtained in such a manner that when a cathode active material as a lithium-containing composite oxide is prepared, a boron compound is mixed with a precursor material, and the mixture is fired to replace a part of cobalt with boron.

Further, in order to improve heat stability, Patent Document 7 discloses a composite oxide comprising lithium and a transition metal, such as $Li_xNi_yCo_{0.2}O_2X_{(1-y-z)}O_w$ (wherein X is Al or Mn, $0.95 \leq x \leq 1.10$, $0.1 \leq y \leq 0.9$, $0.1 \leq z \leq 0.9$, $1.8 \leq w \leq 2.2$) which is obtained in such a manner that a lithium compound and lithium borate are mixed with a precursor material for cathode active material, and the mixture is fired to let lithium borate be present on the surface of particles.

However, heretofore, a cathode active material made of a lithium-containing composite oxide has been unknown, which can remarkably suppress gas generation during its use, without impairing any one of characteristics such as volume capacity density, safety, average operation voltage, durability for charge and discharge cycles and low temperature characteristics.

Patent Document 1: JP-A-2003-234102
Patent Document 2: JP-A-2003-7299
Patent Document 3: JP-A-2003-221234
Patent Document 4: JP-A-2004-319105
Patent Document 5: JP-A-2004-103566
Patent Document 6: JP-A-5-325971
Patent Document 7: JP-A-2004-335278

SUMMARY OF THE INVENTION

It is an object of the present invention to provide a process for producing a lithium-containing composite oxide for a positive electrode for a lithium secondary battery, a positive electrode for a lithium secondary battery, and a lithium secondary battery, which can substantially suppress gas generation without impairing the large volume capacity density, high safety, high average operation voltage, excellent durability for charge and discharge cycles and further excellent characteristics such as low temperature characteristics.

The present inventors have conducted extensive studies and have found that when a specific lithium-containing composite oxide for a positive electrode for a lithium secondary battery, such as the above-mentioned lithium cobaltate, containing an N element and, if necessary, an M element and fluorine, is to be produced, the above object can be accomplished in such a manner that a lithium composite oxide powder containing an N element and, if necessary, an M element and fluorine, is preliminarily prepared; such a lithium composite oxide powder is mixed with an aqueous solution containing boron and/or phosphorous, preferably an aqueous solution containing boric acid and/or phosphoric acid and a compound having at least two in total of carboxylic acid groups, or carboxylic acid groups and hydroxyl groups in its molecule; from the obtained mixture, an aqueous medium is removed; followed by firing in an oxygen-containing atmosphere.

In the present invention, the mechanism of achievement of the above object is not necessarily clearly understood, but is considered to be as follows. In the present invention, the lithium composite oxide powder is in contact with an aqueous solution containing an L element source, preferably an aqueous acidic solution such as boric acid and/or phosphoric acid. As a result, the lithium composite oxide powder which is alkaline in nature will have its particle surface dissolved when it is in contact with the aqueous acidic solution. It is considered that such dissolution of the surface of such a cathode active material causes disappearance of the fresh surface on the active material or disappearance of microscopic pores which cannot be observed in an SEM image, and as a result, deactivates the active sites of the cathode active material which cause the decomposition of the electrolyte to bring about gas generation. Particularly, in the present invention, when the aqueous solution containing an L element source, contains a compound having carboxylic acid groups or carboxylic acid groups and hydroxyl groups to form a chelate complex together with a metal, in addition to boric acid and/or phosphoric acid, the surface etching effect will be further improved, and the gas generation will be remarkably suppressed. Further, it is considered that such a phenomenon takes place in an extremely microscopic area of the cathode active material, and thus will not impair the excellent volume capacity density, safety, charge and discharge cyclic durability and low temperature characteristics of the cathode active material made of the lithium-containing composite oxide.

Thus, the present invention is essentially directed to the following.

(1) A process for producing a lithium-containing composite oxide for a positive electrode for a lithium secondary battery, represented by the formula $Li_pL_qN_xM_yO_zF_a$ (wherein L is at least one element selected from the group consisting of B and P, N is at least one element selected from the group consisting of Co, Mn and Ni, M is at least one element selected from the group consisting of Al, alkaline earth metal elements and transition metal elements other than N, $0.9 \leq p \leq 1.1$, $10.0 \leq q \leq 0.03$, $0.97 \leq x < 1.00$, $0 \leq y \leq 0.03$, $1.9 \leq z \leq 2.1$, q+x+y=1 and $0 \leq a \leq 0.02$), which comprises firing a mixture of compounds containing a lithium source, an L element source, an N element source and, if necessary, an M element source and a fluorine source, wherein a lithium-containing composite oxide powder containing an N element and, if necessary, an M element and fluorine, is preliminarily prepared; the lithium-containing composite oxide powder is mixed with an aqueous solution containing the L element source; from the obtained mixture, an aqueous medium is removed; followed by the firing in an oxygen-containing atmosphere at from 300 to 1,050° C.

(2) The process according to the above (1), wherein the aqueous solution containing an L element source is an aqueous solution containing boric acid and a compound having at least two in total of carboxylic acid groups, or carboxylic acid groups and hydroxyl groups, in its molecule.

(3) The process according to the above (1), wherein the aqueous solution containing an L element source is an aqueous solution containing phosphoric acid and a compound having at least two in total of carboxylic acid groups, or carboxylic acid groups and hydroxyl groups, in its molecule.

(4) The process according to any one of the above (1) to (3), wherein the aqueous solution containing an L element source has a pH of at most 3.

(5) The process according to any one of the above (1) to (4), wherein the M element is at least one element selected from the group consisting of Zr, Hf, Ti, Nb, Ta, Mg, Cu, Sn, Zn and Al.

(6) The process according to any one of the above (1) to (5), wherein the M element comprises at least Al and Mg, the atomic ratio of Al/Mg is from 1/3 to 3/1, and $0.005 \leq y \leq 0.025$.

(7) The process according to any one of the above (1) to (5), wherein the M element comprises Mg and M2 (M2 is at least one element selected from the group consisting of Zr, Nb, Ta and Ti), the atomic ratio of M2/Mg is from 1/40 to 2/1, and $0.005 \leq y \leq 0.025$.

(8) The process according to any one of the above (1) to (7), wherein the integral breadth of the diffraction peak of (110) plane at $2\theta=66.5\pm1°$ of the lithium-containing composite oxide is from 0.08 to 0.14° as measured by means of powder X-ray diffraction analysis using CuKα rays, the surface area is from 0.2 to 0.7 $m^2/g$, and the heat generation starting temperature is at least 160° C.

(9) A positive electrode for a lithium secondary battery containing a lithium-containing composite oxide produced by the process as defined in any one of the above (1) to (8).

(10) A lithium secondary battery using the positive electrode as defined in the above (9).

The present invention provides a process for producing a lithium-containing composite oxide such as a lithium cobalt composite oxide, which can remarkably suppress gas generation without impairing the large volume capacity density, high safety, high average operation voltage, excellent durability for charge and discharge cycles and further excellent characteristics such as low temperature characteristics. The positive electrode for a lithium secondary battery containing the lithium-containing composite oxide provided in the present invention is low in gas generation, and it is possible to provide a lithium secondary battery having e.g. swelling substantially suppressed even when such a battery is a prismatic cell.

BEST MODE FOR CARRYING OUT THE INVENTION

Figure 1:
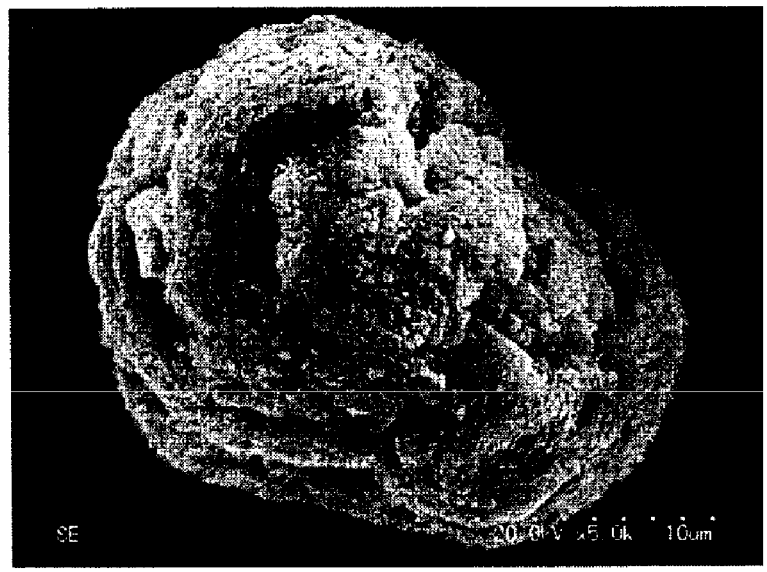
FIG. 1: An SEM photograph (5000 magnification) of the lithium-containing composite oxide particle in Example 2 of the present invention.
Figure 2:
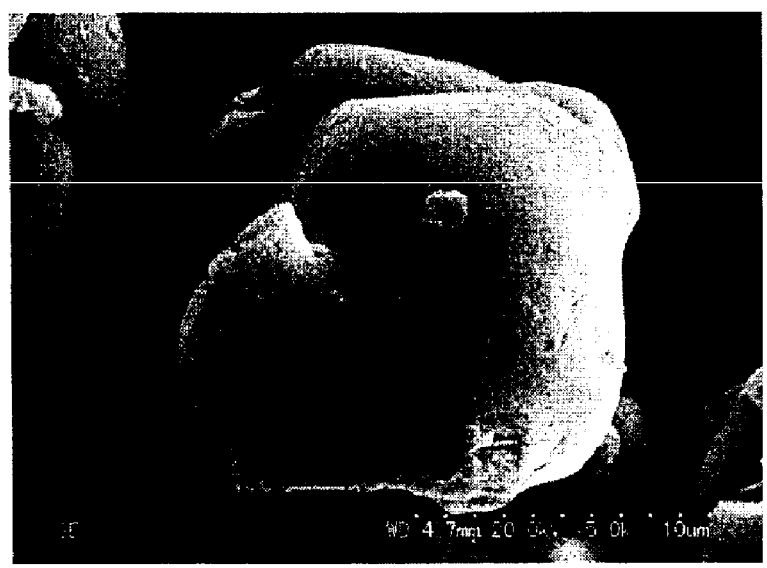
FIG. 2: An SEM photograph (5000 magnification) of the lithium-containing composite oxide particle in Comparative Example 1.

The lithium-containing composite oxide for the positive electrode for a lithium secondary cell to be produced in the present invention is represented by the formula $Li_pL_qN_xM_yO_zF_a$. In the formula, p, q, x, y, z and a are as defined above. Among them, p, q, x, y, z and a are preferably as follows: $0.97 \leq p \leq 1.03$, $0 \leq q \leq 0.01$, $0.99 \leq x \leq 1.00$, $0.0005 \leq y \leq 0.025$, $1.95 \leq z \leq 2.05$, q+x+y=1 and $0.001 \leq a \leq 0.01$. Here, when a is larger than 0, it is a composite oxide having some of its oxygen atoms substituted by fluorine atoms. In such a case, the safety of the cathode active material to be obtained will be improved.

Further, the L element is boron and/or phosphorus, particularly preferably boron. The N element is at least one element selected from the group consisting of Co, Mn and Ni, and among them, Co, Ni, Co and Ni, Mn and Ni, or Co, Ni and Mn, are preferred. The M element is at least one element selected from the group consisting of aluminum, alkaline earth metal elements and transition metal elements other than the N element. Here, the transition metal elements represent transition metals of Group 4, Group 5, Group 6, Group 7, Group 8, Group 9, Group 10 and Group 11, of the Periodic Table. Among them, the M element is preferably at least one element selected from the group consisting of Zr, Hf, Ti, Nb, Ta, Mg, Cu, Sn, Zn and Al. Especially, Zr, Hf, Ti, Mg or Al is preferred from the viewpoint of the capacity development properties, safety, cyclic durability or the like.

In the present invention, the M element preferably comprises Al and Mg, and the atomic ratio of Al to Mg is preferably from 1/3 to 3/1, particularly preferably from 2/3 to 3/2. Further, it is suitable that y is preferably $0.005 \leqq y \leqq 0.025$, particularly preferably $0.01 \leqq y \leqq 0.02$. Such a case is particularly preferred since the battery performance i.e. the initial weight capacity density, the initial volume capacity density, the safety and the charge and discharge cyclic stability will be balanced.

Further, in the present invention, the M element preferably comprises Mg and M2 (wherein M2 is at least one element selected from the group consisting of Zr, Nb, Ta and Ti), the atomic ratio of M2 to Mg is preferably from 1/40 to 2/1, particularly preferably from 1/30 to 1/5. Further, it is suitable that y is preferably $0.005 \leqq y \leqq 0.025$, particularly preferably $0.01 \leqq y \leqq 0.02$. Such a case is particularly preferred since the battery performance i.e. the initial weight capacity density, the initial volume capacity density, the safety and the charge and discharge cyclic stability will be balanced.

In the present invention, in a case where the above M element and/or fluorine is incorporated, it is preferred that the M element is uniformly present in the lithium-containing composite oxide particles and on the surface thereof. Whereas, fluorine is preferably present on the surface of the lithium-containing composite oxide particles. By the presence of fluorine on the surface thereof, the battery performance will not be deteriorated by addition of a small amount, such being preferred. Further, by the presence of the M element in the particles and on the surface thereof, battery performances such as the safety and the charge and discharge cyclic properties can be improved. The presence of the elements on the surface can be judged by carrying out a spectroscopic analysis such as an XPS analysis with respect to the positive electrode particles.

As the N element source to be used in the present invention, in a case where the N element is cobalt, cobalt carbonate, cobalt hydroxide, cobalt oxyhydroxide or cobalt oxide is preferably used. Particularly preferred is cobalt hydroxide or cobalt oxyhydroxide, whereby the performance can readily be developed. Further, in a case where the N element is nickel, nickel hydroxide or nickel carbonate is preferably used. Further, in a case where the N element is manganese, manganese carbonate is preferably used. Further, in a case where the N element source is a compound containing nickel and cobalt, preferred is, for example, $Ni_{0.8}Co_{0.02}OOH$ or $Ni_{0.8}Co_{0.02}(OH)_2$, in a case where the N element source is a compound containing nickel and manganese, preferred is, for example, $Ni_{0.5}Mn_{0.5}OOH$, and in a case where the N element is a compound containing nickel, cobalt and manganese, preferred is, for example, $Ni_{0.4}CO_{0.2}Mn_{0.4}(OH)_2$ or $Ni_{1/3}Co_{1/3}Mn_{1/3}OOH$.

As the lithium source to be used in the present invention, lithium carbonate or lithium hydroxide is preferably used. Lithium carbonate which is available at a low cost is particularly preferred. The fluorine source may be a metal fluoride, and preferably, LiF or $MgF_2$ may be selected for use.

The M element source to be used in the present invention may be an inorganic salt such as an oxide, hydroxide, carbonate or nitrate; an organic salt such as an acetate, oxalate, citrate, lactate, tartarate, malate or malonate; or an organic metal chelate complex or a compound having a metal alkoxide stabilized with e.g. a chelate agent. The M element source to be used in the present invention is more preferably one which is uniformly soluble in water, such as a water soluble carbonate, nitrate, acetate, oxalate, citrate, lactate, tartarate, malate, malonate or succinate. Especially, a citrate or a tartarate is preferred as the solubility is high. Further, in an aqueous oxalate or citrate solution having a low pH, e.g. a cobalt salt may be dissolved in some cases, and in such a case, it is particularly preferred to add ammonia to the aqueous solution so as to bring the pH of the solution to a level of from 6 to 10.

In the present invention, the lithium-containing composite oxide for a positive electrode for a lithium secondary battery is prepared in such a manner that a lithium composite oxide powder containing an N element and, if necessary, an M element and fluorine, is preliminarily prepared; such a lithium composite oxide powder is mixed with an aqueous solution containing the L element source; from the obtained mixture, an aqueous medium is removed; followed by firing in an oxygen-containing atmosphere at from 300 to 1,050° C.

The M element source in the lithium-containing composite oxide is preferably used in the form of not only a powder but also an aqueous solution as measured above. Further, in the case where the respective element sources are used in the form of powders, the average particle size of such a powder is not particularly limited, but is preferably from 0.1 to 20 μm, particularly preferably from 0.5 to 15 μm so that the powders will be well mixed.

In the process of the present invention, a lithium-containing composite oxide powder containing an N element and, if necessary, an M element and fluorine, is produced by using the above N element source, M element source and fluorine source. The production of such a lithium-containing composite oxide powder is carried out by a known method. For example, the production is carried out in such a manner that lithium carbonate, cobalt oxyhydroxide, magnesium carbonate and aluminum hydroxide are mixed in prescribed amounts, and fired in an oxygen-containing atmosphere at from 800 to 1,050° C., followed by pulverizing the fired product by a pulverizer.

The lithium-containing composite oxide powder obtained is then mixed with an aqueous solution containing an L element source. As the aqueous solution containing an L element source, an aqueous solution of a compound containing boron and/or phosphorus, preferably an aqueous solution containing boric acid and/or phosphoric acid is used. Such an aqueous solution containing an L element source suitably has a pH of preferably at most 3, particularly preferably at most 2.8. Particularly, the aqueous solution containing an L element source is preferably an aqueous solution containing boric acid and/or phosphoric acid, and a compound having at least two in total of carboxylic acid groups, or carboxylic acid groups and hydroxyl groups in its molecule, and especially, such an aqueous solution preferably has a pH of at most 3, particularly preferably at most 2.8.

The water content in the aqueous solution containing an L element source is preferably low, since it is necessary to remove the aqueous medium by drying in a subsequent step. However, if the water content is too low, the viscosity of the aqueous solution tends to be high, whereby the uniform mixing properties with the lithium-containing composite oxide powder to form a cathode active material tends to decrease. Thus, it is preferably at most 30 mass %, particularly preferably at most 20 mass %.

In the present invention, as the above compound having at least two in total of carboxylic acid groups, or carboxylic acid groups and hydroxyl groups in its molecule, it is possible to advantageously use a carboxylic acid such as citric acid, oxalic acid, lactic acid, tartaric acid, maleic acid, malonic acid or succinic acid. Especially, readily available citric acid is preferred. The content of the carboxylic acid in the aqueous solution containing an L element source, is preferably from 1 to 20 mass %, particularly preferably from 5 to 15 mass %.

Further, the mixing ratio of the lithium-containing composite oxide powder and the above aqueous solution containing an L element source is adjusted to achieve the desired ratio of the respective elements within a range of the above $Li_pL_qN_xM_yO_zF_a$ as the formula of the cathode active material to be produced in the present invention. Further, the L element may be present in the interior of the lithium-containing composite oxide and/or on the surface thereof, or may not be contained in the lithium-containing composite oxide after firing, since the L element may be evaporated by the firing. Even when the L element is not present, so long as the active sites on the surface of the obtainable positive electrode active material will be deactivated and a uniform surface composition will be obtained, the gas generation can be suppressed. Further, when the L element is present, the N element in the cathode active material is partly substituted by the L element, or an electrochemically stable composite oxide containing the L element is formed, whereby further improvement in the safety can be expected.

In the present invention, it is observed that microscopic irregularities appear on the surface of particles by reprecipitation of a dissolved positive electrode component in a drying step, and the surface will not be smooth. However, the surface area does not change so much before and after the treatment, and it rather tends to be small. The reason for such a tendency is considered to be such that instead of the disappearance of microscopic pores which can not be observed by SEM, protrusions which can be observed with SEM, appear.

The above aqueous solution containing the element sources and the lithium-containing composite oxide powder are preferably mixed sufficiently and uniformly to form a slurry preferably by using an axial mixer or a paddle mixer. The solid content in the slurry is preferably high so long as the uniform mixing is achieved, but usually the solid/liquid (mass ratio) is suitably from 50/50 to 90/10, particularly preferably from 60/40 to 80/20.

Removal of the aqueous medium from the obtained mixture is carried out by drying it at preferably from 50 to 200° C., particularly preferably from 80 to 120° C. usually from 1 to 10 hours. The aqueous medium in the mixture is not necessarily completely removed at this stage since it will be removed also in the subsequent firing step, but it is preferably removed as far as possible since a large quantity of energy will be required to remove water in the firing step.

Firing after removal of the aqueous medium is carried out at from 300 to 1,050° C. in an oxygen-containing atmosphere. If such a firing temperature is lower than 300° C., decomposition of the carboxylic acid tends to be insufficient. On the other hand, if it exceeds 1,050° C., the durability for charge and discharge cycles and the initial capacity tend to be low. Particularly, it is suitable that the firing temperature is from 400 to 700° C.

With respect to the lithium-containing composite oxide thus produced, the average particle size D50 is preferably from 5 to 15 μm, particularly preferably from 8 to 12 μm, the specific surface area is preferably from 0.2 to 0.6 m²/g, particularly preferably from 0.3 to 0.5 m²/g, the half value width of the diffraction peak of (110) plane at 2θ=66.5±1° as measured by means of powder X-ray diffraction analysis using CuKα rays, is preferably from 0.08 to 0.14°, particularly preferably from 0.08 to 0.12°, and the press density is preferably from 3.05 to 3.50 g/cm³, particularly preferably from 3.10 to 3.40 g/cm³.

In a case where a positive electrode for a lithium secondary battery is produced from the above lithium-containing composite oxide, it is formed by mixing the powder of the above lithium-containing composite oxide with a binder material and a carbon type electroconductive material such as acetylene black, graphite or Ketjenblack. As the above binder material, polyvinylidene fluoride, polytetrafluoroethylene, polyamide, carboxymethyl cellulose or an acrylic resin may, for example, be preferably used.

By using a solvent or a dispersion medium, the powder of the lithium-containing composite oxide of the present invention, the electroconductive material and the binding material are formed into a slurry or a kneaded product, which is then supported on a positive electrode current collector such as an aluminum foil or a stainless steel foil by e.g. coating, to form a positive electrode for a lithium secondary battery.

In a lithium secondary battery using the lithium-containing composite oxide of the present invention as the cathode active material, e.g. a film of a porous polyethylene or a porous polypropylene may be used as the separator. Further, as the solvent of the electrolytic solution of the battery, various solvents may be used. However, a carbonate ester is preferred. As the carbonate ester, each of a cyclic type and a chain type can be used. As the cyclic carbonate ester, propylene carbonate or ethylene carbonate (EC) may, for example, be mentioned. As the chain carbonate ester, dimethyl carbonate, diethyl carbonate (DEC), ethyl methyl carbonate (EMC), methyl propyl carbonate or methyl isopropyl carbonate may, for example, be mentioned.

In the present invention, the above carbonate ester may be used alone or by mixing at least two types. Further, it may be used by mixing with another solvent. Further, according to the material of the anode active material, if the chain carbonate ester is used together with the cyclic carbonate ester, there is a case where the discharge properties, the cyclic durability or the charge and discharge efficiency can be improved.

Further, as an electrolyte of the lithium secondary battery using the lithium-containing composite oxide of the present invention as the cathode active material, a gel polymer electrolyte containing a vinylidene fluoride-hexafluoropropylene copolymer (for example, KYNAR manufactured by ELF Atochem) or a vinylidene fluoride-perfluoropropyl vinyl ether copolymer may be employed. As the solute to be added to the electrolytic solvent or the polymer electrolyte, at least one member of lithium salts is preferably used, wherein e.g. $ClO_4^-$, $CF_3SO_3^-$, $BF_4^-$, $PF_6^-$, $AsF_6^-$, $SbF_6^-$, $CF_3CO_2^-$ or $(CF_3SO_2)_2N^-$ is anion. The above lithium salt as the solute is preferably added at a concentration of from 0.2 to 2.0 mol/L (liter) to the electrolytic solvent or the polymer electrolyte. If the concentration departs from this range, ionic conductivity will decrease, and the electrical conductivity of the electrolyte will decrease. More preferably, it is from 0.5 to 1.5 mol/L.

In the lithium battery using the lithium-containing composite oxide of the present invention as the cathode active material, as the anode active material, a material which can occlude and discharge lithium ions may be used. The material forming the anode active material is not particularly limited, however, a lithium metal, a lithium alloy, a carbon material, an oxide comprising, as a main body, a metal of Group 14 or Group 15 of the Periodic Table, a carbon compound, a silicon carbide compound, a silicon oxide compound, titanium sulfide or a boron carbide compound may, for example, be mentioned. As the carbon material, an organic material which is subjected to thermal decomposition under various thermal decomposition conditions, artificial graphite, natural graphite, soil graphite, exfoliated graphite or flake graphite etc. can be used. Further, as the oxide, a compound comprising tin oxide as a main body can be used. As the negative electrode current collector, a copper foil, a nickel foil etc. can be used. The negative electrode is produced preferably by kneading the above anode active material with an organic solvent to form a slurry, which is coated on the metal foil current collector, dried and pressed.

The shape of the lithium battery using the lithium-containing composite oxide of the present invention as the cathode active material is not particularly limited. Sheet, film, folding, winding type cylinder with bottom or button shape etc. is selected according to use.

EXAMPLES

Now, the present invention will be described in further detail with reference to Examples of the present invention and Comparative Examples. However, the present invention is by no means restricted to such specific Examples. Here, Examples 2, 5, 7 and 9 are Examples of the present invention, and Examples 1, 3, 4, 6 and 8 are Comparative Examples.

Example 1

A mixed solution of a cobalt sulfate aqueous solution with ammonium hydroxide and a caustic soda aqueous solution were continuously mixed, whereby a cobalt hydroxide slurry was continuously prepared by a known method, followed by steps of agglomeration, filtration and drying to obtain a cobalt hydroxide powder. Powder X-ray diffraction analysis of the obtained cobalt hydroxide using CuKα rays showed that the half value width of the diffraction peak of (001) plane at $2\theta=19\pm1°$ was 0.27°, and the half value width of the diffraction peak of (101) plane at $2\theta=38°\pm1$ was 0.23°. As a result of observation by scanning electron microscope, the particles were found to be ones having fine particles agglomerated to form substantially spherical secondary particles. As a result of particle size distribution analysis on the volume basis calculated from image analysis of observation by scanning electron microscope, the average particle size D50 was 13.3 µm, D10 was 6.5 µm and D90 was 18.0 µm. The cobalt content in the cobalt hydroxide was 61.5%.

195.82 g of the above cobalt hydroxide and 75.85 g of a lithium carbonate powder having a specific surface area of 1.2 $m^2/g$ were mixed. This mixed powder was fired in the air at 950° C. for 12 hours to obtain lithium cobaltate. The fired product was crushed, and the particle size distribution of a lithium-containing composite oxide powder formed by agglomeration of primary particles was measured in a water solvent by using a laser scattering type particle size distribution measuring apparatus and as a result, the average particle size D50 was 13.3 µm, D10 was 6.7 µm and D90 was 18.5 µm, and a substantially spherical lithium-containing composite oxide powder having a specific surface area of 0.33 $m^2/g$ as measured by means of BET method, was obtained. With respect to the lithium-containing composite oxide powder, an X-ray diffraction spectrum was obtained by using an X-ray diffraction apparatus (RINT2100 model, manufactured by Rigaku Corporation). Powder X-ray diffraction analysis using CuKα rays showed that the half value width of the diffraction peak of (110) plane at $2\theta=66.5\pm1°$ was 0.114°. The press density of this powder was 3.08 $g/cm^3$.

The above lithium-containing composite oxide powder, acetylene black and a polyvinylidene fluoride powder were mixed in a mass ratio of 90/5/5, and N-methylpyrrolidone was added to form a slurry, which was applied on one side of an aluminum foil with a thickness of 20 µm by a doctor blade. After drying, roll pressing was carried out five times to obtain a positive electrode sheet for a lithium battery.

Then, using one punched out from the above positive electrode sheet as a positive electrode, using a metal lithium foil having a thickness of 500 µm as a negative electrode, using a nickel foil of 20 µm as a negative electrode current collector, using a porous polypropylene having a thickness of 25 µm as a separator and using a $LiPF_6$/EC+DEC (1:1) solution (it means a mixed solution of EC and DEC in a mass ratio (1:1) of which the solute is $LiPF_6$, the same applies to solvents as mentioned hereinafter) at a concentration of 1M as an electrolytic solution, a pair of simplified sealed cell type lithium batteries made of stainless steel were assembled in an argon grove box.

A piece of the battery was charged up to 4.3 V at a load current of 75 mA per 1 g of the cathode active material at 25° C., and discharged down to 2.5 V at a load current of 75 mA per 1 g of the cathode active material, whereby the initial weight capacity density was obtained. Further, the density of the electrode layer was measured. Further, the charge and discharge cyclic test was sequentially carried out 30 times by use of this battery. As a result, the initial weight capacity density of the positive electrode layer at from 2.5 to 4.3 V at 25° C. was 161 mAh/g, and the average discharge voltage was 3.94 V and the capacity retention was 96.0% after 30 times of charge and discharge cycle.

Further, the other battery was charged for 10 hours at 4.3 V, and then disassembled in the argon grove box. The positive electrode sheet was taken out after charge, and after the positive electrode sheet was washed, it was punched out at a diameter of 3 mm, and then sealed in an aluminum capsule with EC. And then, it was heated at a rate of 5° C./min by using a scanning differential calorimeter, whereby the heat generation starting temperature was measured. As a result, the heat generation starting temperature of the 4.3 V charged material was 157° C.

Further, the gas generation is inspected in such a manner that the battery is sealed with an aluminum laminate film and charged, stored at a high temperature, and then evaluated by employing, as an index, the amount of deformation due to increase of the internal pressure. The aluminum laminate film in the present invention may be a laminate film having plastic films laminated on both sides of an aluminum foil. As a plastic film to be laminated thereon, usually, polypropylene or polyethylene may, for example, be mentioned. The positive electrode as prepared in the same manner as in the above method, in which a current collector tablet made of an aluminum foil was mounted to prepare the positive electrode.

The anode active material was prepared in such a manner that a graphite having D50 of 20 µm and a specific surface area of 4.4 $m^2/g$ and a polyvinylidene fluoride powder as a binding agent were mixed in a ratio of 92:8, the mixture was added to N-methyl-2-pyrrolidone as a dispersion medium, followed by kneading them to prepare a negative electrode slurry, which was then applied on a side of a copper foil with a thickness of 20 µm by a doctor blade. After drying, roll pressing was carried out five times to prepare a negative electrode sheet for a lithium battery, and a current collector tablet made of a nickel foil was mounted thereon to prepare a negative electrode.

The above positive electrode and negative electrode were subjected to vacuum-drying at 120° C. for 3 hours, and then faced each other via a separator in an argon grove box, followed by rolling them flatly to prepare an electrode device. Such an electrode device was put in an aluminum laminate bag with a thickness of 0.11 mm, an electrolyte having an $LiPF_6$/EC+DEC(1:1) solution of 1M as a component is injected thereto, and then sealed with a heat sealer. The size of such a laminate battery is 3.66 mm in thickness×3.5 cm in width×6.2 cm in length.

The above lithium ion secondary battery made of an aluminum laminate was charged by 550 mA of constant current at room temperature so as to have a voltage of 4.2 V, and then constant voltage was applied to charge it until the current became 27 mA, and then stored for 3 hours in a constant temperature bath of 85° C. After the battery was stored, cooling was carried out at room temperature for 1 hour, and then the thickness of the battery was measured, and as a result, the increase in thickness was 3.04 mm.

Example 2

1.27 g of boric acid was mixed with a solution having 44.41 g of water dissolved in 4.32 g of citric acid monohydrate, and the mixture was stirred for 30 minutes to obtain an aqueous solution having a pH of 2.8. The aqueous solution was added to a lithium cobaltate powder to prepare a slurry.

The slurry was dehydrated in a dryer at 120° C. for 2 hours, followed by firing in the air at 500° C. for 12 hours to obtain $LiCo_{0.99}B_{0.01}O_2$. The fired product was crushed to obtain a lithium-containing composite oxide powder formed by agglomeration of primary particles, and the particle size distribution of the powder was measured in water solvent by using a laser scattering type particle size distribution measuring apparatus. As a result, a substantially spherical lithium-containing composite oxide powder having an average particle size D50 of 13.4 µm, D10 of 6.5 µm and D90 of 18.8 µm, and a specific surface area of 0.28 m$^2$/g as measured by means of BET method, was obtained. With respect to such a lithium-containing composite oxide powder, an X-ray diffraction spectrum was obtained by using an X-ray diffraction apparatus (RINT 2100 model, manufactured by Rigaku Corporation). Powder X-ray diffraction analysis using CuKα rays showed that the half value width of the diffraction peak of (110) plane at $2\theta=66.5\pm1°$ was 0.110°. The press density of this powder was 3.05 g/cm$^3$.

In the same manner as in Example 1, a positive electrode was prepared from the above lithium-containing composite oxide powder, batteries were assembled, and the characteristics were measured. The positive electrode layer at an initial weight capacity density was 160 mAh/g, the average discharge voltage was 3.94 V, and the capacity retention was 98.4% after 30 times of charge and discharge cycle. The heat generation starting temperature of the 4.3 V charged material was 161° C.

Further, in the same manner as the above, an aluminum laminate lithium ion secondary battery was prepared, and high temperature storage characteristics were evaluated. As a result, the increase in thickness was 1.95 mm.

Example 3

0.71 g of boron oxide, 194.82 g of cobalt hydroxide and 76.22 g of lithium carbonate were mixed, whereby a lithium-containing oxide was prepared by blending to result in $LiCo_{0.99}B_{0.01}O_2$ after firing. An agglomerated lithium-containing composite oxide powder having an average particle size D50 of 13.5 µm, D10 of 6.5 µm and D90 of 18.1 µm, and a specific surface area of 0.30 m$^2$/g as measured by means of BET method, was obtained. With respect to this powder, an X-ray diffraction spectrum was obtained by using an X-ray diffraction apparatus (RINT 2100 model, manufactured by Rigaku Corporation). Powder X-ray diffraction analysis using CuKα rays showed that the half value width of the diffraction peak of (110) plane in the vicinity of $2\theta=66.5\pm1°$ was 0.121°. The press density of this powder was 2.97 g/cm$^3$.

In the same manner as in Example 1, a positive electrode was produced, batteries were assembled, and the characteristics were measured. The initial weight capacity density of the positive electrode layer was 152 mAh/g, the average discharge voltage was 3.92 V and the capacity retention was 94.3% after 30 times of charge and discharge cycles. The heat generation starting temperature of the 4.3 V charged material was 155° C.

In the same manner as in Example 1, an aluminum laminate lithium ion secondary battery was prepared and the high temperature storage characteristics were evaluated. As a result, the increase in thickness was 2.51 mm.

Example 4

3.10 g of aluminum lactate having an aluminum content of 17.99%, 1.95 g of magnesium carbonate having a magnesium content of 25.81% and 13.70 g of citric acid monohydrate, were mixed, and 41.25 g of water was added to prepare a solution having the mixture dissolved therein. This solution and 192.20 g of cobalt hydroxide were mixed. Such a mixture was dehydrated in a dryer at 120° C. for 2 hours, then 76.75 g of lithium carbonate was added and mixed, followed by firing in the air at 950° C. for 12 hours to prepare a lithium-containing oxide so that the composition would be $LiAl_{0.01}Co_{0.98}Mg_{0.01}O_2$ after firing. An agglomerated lithium-containing composite oxide powder having an average particle size D50 of 14.0 µm, D10 of 6.7 µm and D90 of 19.4 µm, and a specific surface area of 0.32 m$^2$/g as measured by means of BET method, was obtained. With respect to this powder, an X-ray diffraction spectrum was obtained by using an X-ray diffraction apparatus (RINT 2100 model, manufactured by Rigaku Corporation). Powder X-ray diffraction analysis using CuKα rays showed that the half value width of the diffraction peak of (110) plane in the vicinity of $2\theta=66.5\pm1°$ was 0.109°. The press density of the lithium-containing composite oxide powder obtained was 3.07 g/cm$^3$.

In the same manner as in Example 1, a positive electrode was produced, batteries were assembled, and the characteristics were measured. The initial weight capacity density of the positive electrode layer was 156 mAh/g, the average discharge voltage was 3.91 V and the capacity retention was 98.1% after 30 times of charge and discharge cycles. The heat generation starting temperature of the 4.3 V charged material was 163° C.

In the same manner as in Example 1, an aluminum laminate lithium ion secondary battery was prepared, and the high temperature storage characteristics were evaluated. As a result, the increase in thickness was 2.47 mm.

Example 5

The above lithium-containing composite oxide in Example 4 and an aqueous solution with pH 2.8 having 1.28 g of boric acid and 4.35 g of citric acid dissolved in 44.37 g of water, were mixed, dried and fired to obtain a lithium-containing composite oxide having a composition of $LiAl_{0.01}B_{0.01}Co_{0.97}Mg_{0.01}O_2$. An agglomerated lithium-containing composite oxide powder having an average particle size D50 of 13.9 µm, D10 of 6.6 µm and D90 of 19.1 µm, and having a specific surface area of 0.29 m$^2$/g as measured by means of BET method, was obtained. With respect to this powder, an X-ray diffraction spectrum was obtained by using an X-ray diffraction apparatus (RINT 2100 model, manufactured by Rigaku Corporation). Powder X-ray diffraction analysis using CuKα rays showed that the half value width of the diffraction peak of (110) plane in the vicinity of 2θ=66.5±1° was 0.106°. The press density of the lithium-containing composite oxide powder obtained was 3.05 g/cm³.

Further, in the same manner as in Example 1, a positive electrode was produced, batteries were assembled, and the characteristics were measured. The initial weight capacity density of the positive electrode layer was 155 mAh/g, the average discharge voltage was 3.91 V, the capacity retention was 99.0% after 30 times of cycles, and the heat generation starting temperature was 165° C.

In the same manner as in Example 1, an aluminum laminate lithium ion secondary battery was prepared, and the high temperature storage characteristics were evaluated. As a result, the increase in thickness was 1.61 mm.

Example 6

3.10 g of aluminum lactate having an aluminum content of 17.99%, 1.94 g of magnesium carbonate having a magnesium content of 25.81% and 14.28 g of citric acid monohydrate, were mixed, then, 39.48 g of water was added to dissolve the mixture, and 1.20 g of a titanium lactate aqueous solution having a titanium content of 8.20% was added thereto to prepare a solution. Such a solution was mixed with 191.62 g of cobalt hydroxide. Such a mixture was dehydrated in a dryer at 120° C. for 2 hours, then 76.60 g of lithium carbonate was added and mixed, followed by firing in the air at 950° C. for 12 hours to prepare a lithium-containing oxide so that the composition would be $LiAl_{0.01}Co_{0.979}Mg_{0.01}Ti_{0.001}O_2$ after firing. An agglomerated lithium-containing composite oxide powder having an average particle size D50 of 13.5 μm, D10 of 6.5 μm and D90 of 18.4 μm, and having a specific surface area of 0.31 m²/g as measured by means of BET method, was obtained. With respect to this powder, an X-ray diffraction spectrum was obtained by using an X-ray diffraction apparatus (RINT 2100 model, manufactured by Rigaku Corporation). Powder X-ray diffraction analysis using CuKα rays showed that the half value width of the diffraction peak of (110) plane in the vicinity of 2θ=66.5±1° was 0.111°. The press density of the lithium-containing composite oxide powder obtained was 3.11 g/cm³.

In the same manner as in Example 1, a positive electrode was produced, batteries were assembled, and the characteristics were measured. The initial weight capacity density of the positive electrode layer was 152 mAh/g, the average discharge voltage was 3.95 V, and the capacity retention was 97.9% after 30 times of charge and discharge cycles. The heat generation starting temperature of the 4.3 V charged material was 163° C.

In the same manner as in Example 1, an aluminum laminate lithium ion secondary battery was prepared, and the high temperature storage characteristics were evaluated. As a result, the increase in thickness was 2.62 mm.

Example 7

The above lithium-containing composite oxide obtained in Example 6 and an aqueous solution with pH 2.5 having 2.02 g of phosphoric acid and 7.23 g of citric acid dissolved in 40.75 g of water, were mixed, dried and fired to obtain a lithium-containing composite oxide having a composition of $LiAl_{0.01}Co_{0.969}Mg_{0.01}P_{0.01}Ti_{0.001}O_2$. An agglomerated lithium-containing composite oxide powder having an average particle size D50 of 13.2 μm, D10 of 6.1 μm and D90 of 18.7 μm, and having a specific surface area of 0.30 m²/g as measured by means of BET method, was obtained. With respect to this powder, an X-ray diffraction spectrum was obtained by using an X-ray diffraction apparatus (RINT 2100 model, manufactured by Rigaku Corporation). Powder X-ray diffraction analysis using CuKα rays showed that the half value width of the diffraction peak of (110) plane in the vicinity of 2θ=66.5±1° was 0.107°. The press density of the lithium-containing composite oxide powder obtained was 3.05 g/cm³.

Further, in the same manner as in Example 1, a positive electrode was produced, batteries were assembled, and the characteristics were measured. The initial weight capacity density of the positive electrode layer was 153 mAh/g, the average discharge voltage was 3.95 V, the capacity retention was 98.8% after 30 times of cycles, and the heat generation starting temperature was 167° C. In the same manner as in Example 1, an aluminum laminate lithium ion secondary battery was prepared, and the high temperature storage characteristics were evaluated. As a result, the increase in thickness was 1.77 mm.

Example 8

3.08 g of aluminum lactate having an aluminum content of 17.99%, 1.94 g of magnesium carbonate having a magnesium content of 25.81% and 14.27 g of citric acid monohydrate, were mixed, then 39.47 g of water was added to dissolve the mixture, and 1.24 g of a zirconium ammonium carbonate aqueous solution having a zirconium content of 15.10% was added thereto to prepare a solution. Such a solution was mixed with 190.98 g of cobalt hydroxide. Such a mixture was dehydrated in a dryer at 120° C. for 2 hours, then 76.34 g of lithium carbonate, was added and mixed, followed by firing in the air at 950° C. for 12 hours to prepare a lithium-containing oxide so that the composition would be $LiAl_{0.01}Co_{0.979}Mg_{0.01}Zr_{0.001}O_2$ after firing. An agglomerated lithium-containing composite oxide powder having an average particle size D50 of 13.7 μm, D10 of 6.6 μm and D90 of 18.1 μm, and a specific surface area of 0.35 m²/g as measured by means of BET method, was obtained. With respect to this powder, an X-ray diffraction spectrum was obtained by using an X-ray diffraction apparatus (RINT 2100 model, manufactured by Rigaku Corporation). Powder X-ray diffraction analysis using CuKα rays showed that the half value width of the diffraction peak of (110) plane in the vicinity of 2θ=66.5±1° was 0.108°. The press density of the lithium-containing composite oxide powder obtained was 3.13 g/cm³.

In the same manner as in Example 1, a positive electrode was produced, batteries were assembled, and the characteristics were measured. The initial weight capacity density of the positive electrode layer was 153 mAh/g, the average discharge voltage was 3.96 V, and the capacity retention was 98.5% after 30 times of charge and discharge cycles. The heat generation starting temperature of the 4.3 V charged material was 166° C.

In the same manner as in Example 1, an aluminum laminate lithium ion secondary battery was prepared, and the high temperature storage characteristics were evaluated. As a result, the increase in thickness was 2.43 mm.

Example 9

The above lithium-containing composite oxide obtained in Example 8 and an aqueous solution with pH 2.8 having 1.27 g of boric acid and 4.32 g of citric acid dissolved in 44.41 g of water, were mixed, dried and fired to obtain a lithium-containing composite oxide having a composition of $LiAl_{0.01}B_{0.01}Co_{0.969}Mg_{0.01}Zr_{0.001}O_2$. An agglomerated lithium-containing composite oxide powder having an average particle size D50 of 13.1 μm, D10 of 6.2 μm and D90 of 18.8 μm, and having a specific surface area of 0.29 m²/g as measured by means of BET method, was obtained. With respect to this powder, an X-ray diffraction spectrum was obtained by using an X-ray diffraction apparatus (RINT 2100 model, manufactured by Rigaku Corporation). Powder X-ray diffraction analysis using CuKα rays showed that the half value width of the diffraction peak of (110) plane in the vicinity of 2θ=66.5±1° was 0.105°. The press density of the lithium-containing composite oxide powder obtained was 3.09 g/cm³.

Further, in the same manner as in Example 1, a positive electrode was produced, batteries were assembled, and the characteristics were measured. The initial weight capacity density of the positive electrode layer was 151 mAh/g, the average discharge voltage was 3.97 V, and the capacity retention was 99.0% after 30 cycles, the heat generation starting temperature was 169° C. In the same manner as in Example 1, an aluminum laminate lithium ion secondary battery was prepared, and the high temperature storage characteristics was evaluated. As a result, the increase in thickness was 1.22 mm.

INDUSTRIAL APPLICABILITY

The present invention provides a lithium-containing composite oxide for a positive electrode for a lithium secondary battery, which has a large volume capacity density, high safety, high average operating voltage and excellent durability for charge and discharge cycles, and which further can remarkably suppress gas generation without impairing excellent characteristics such as low temperature characteristics. Such a lithium-containing composite oxide is useful for a positive electrode for a lithium secondary battery or a lithium secondary battery.

The entire disclosure of Japanese Patent Application No. 2005-36102 filed on Feb. 14, 2005 including specification, claims, drawings and summary is incorporated herein by reference in its entirety.

What is claimed is:

1. A process for producing a lithium composite oxide, represented by the formula $Li_pL_qN_xM_yO_zF_a$ wherein L is at least one element selected from the group consisting of B and P, N is at least one element selected from the group consisting of Co, Mn and Ni, M is at least one element selected from the group consisting of Al, alkaline earth metal elements and transition metal elements other than N, $0.9 \leq p \leq 1.1$, $0.0 < q \leq 0.03$, $0.97 \leq x < 1.00$, $0 \leq y \leq 0.03$, $1.9 \leq z \leq 2.1$, $q+x+y=1$ and $0 \leq a \leq 0.02$, which comprises preparing a lithium composite oxide powder comprising an N element and, optionally an M element and fluorine, mixing the lithium composite oxide powder with an aqueous solution containing an L element source to obtain a first mixture, wherein the aqueous solution comprising an L element source is an aqueous solution comprising boric acid and/or phosphoric acid and a compound having at least two carboxylic acid groups, or carboxylic acid groups and hydroxyl groups, or mixtures thereof;

removing an aqueous medium from the first mixture to obtain a second mixture and firing said second mixture in an oxygen-containing atmosphere at from 300 to 1,050° C.

2. The process according to claim 1, wherein the aqueous solution comprising an L element source is an aqueous solution comprising boric acid and a compound having at least two in total of carboxylic acid groups, or carboxylic acid groups and hydroxyl groups, or mixtures thereof.

3. The process according to claim 1, wherein the aqueous solution comprising an L element source is an aqueous solution comprising phosphoric acid and a compound having at least two in total of carboxylic acid groups, or carboxylic acid groups and hydroxyl groups, or mixtures thereof.

4. The process according to claim 1, wherein the aqueous solution comprising an L element source has a pH of at most 3.

5. The process according to claim 1, wherein the M element is at least one element selected from the group consisting of Zr, Hf, Ti, Nb, Ta, Mg, Cu, Sn, Zn and Al.

6. The process according to claim 1, wherein the M element comprises at least Al and Mg, the atomic ratio of Al/Mg is from 1/3 to 3/1, and $0.005 \leq y \leq 0.025$.

7. The process according to claim 1, wherein the M element comprises Mg and M2, wherein M2 is at least one element selected from the group consisting of Zr, Nb, Ta and Ti, the atomic ratio of M2/Mg is from 1/40 to 2/1, and $0.005 \leq y \leq 0.025$.

8. The process according to claim 1, wherein the integral breadth of the diffraction peak of (110) plane at 2θ=66.5±1° of the lithium composite oxide is from 0.08 to 0.14° as measured by means of powder X-ray diffraction analysis using CuKα rays, the surface area is from 0.2 to 0.7 m²/g, and the heat generation starting temperature is at least 160° C.

9. The process according to claim 1, wherein N is cobalt and a source of N is cobalt carbonate, cobalt hydroxide, cobalt oxyhydroxide or cobalt oxide, or mixtures thereof.

10. The process according to claim 1, wherein N is nickel and a source of N is nickel hydroxide or nickel carbonate, or mixtures thereof.

11. The process according to claim 1, wherein N is manganese and a source of N is manganese carbonate.

12. The process according to claim 1, wherein a source of the M element is in powder form with an average particle size of from 0.1 to 20 μm.

13. The process according to claim 1, wherein the aqueous solution comprising an L element source comprises carboxylic acid in an amount of from 1 to 20 mass %, based on the mass of the aqueous solution.

14. The process according to claim 13, wherein the carboxylic acid is at least one carboxylic acid selected from the group consisting of citric acid, oxalic acid, lactic acid, tartaric acid, maleic acid, malonic acid, and succinic acid.

15. The process according to claim 13, wherein the carboxylic acid is citric acid.

16. The process according to claim 1, wherein the removing an aqueous medium from the first mixture comprises drying said aqueous solution at a temperature of from 80 to 120° C.

17. The process according to claim 1, wherein the firing is performed at a temperature of from 400 to 700° C.

* * * * *